United States Patent [19]
Lucero et al.

[11] Patent Number: 6,084,011
[45] Date of Patent: Jul. 4, 2000

[54] FREEZE/THAW RESISTANT CEMENTITIOUS ADHESIVE FOR COMPOSITE MATERIALS AND METHOD FOR PRODUCTION THEREOF

[76] Inventors: Richard F. Lucero, 12970 W. 63rd Cir. B, Arvada, Colo. 80004; Bruce Davis, 489 S. 13th Ave., Brighton, Colo. 80601

[21] Appl. No.: 08/920,740

[22] Filed: Aug. 29, 1997

[51] Int. Cl.[7] .............................. C08K 3/34; C04B 24/26; C08L 33/26
[52] U.S. Cl. ...................... 524/5; 524/2; 524/4; 523/218
[58] Field of Search ........................ 524/5, 4, 2; 523/218

[56] References Cited

U.S. PATENT DOCUMENTS

| | | | |
|---|---|---|---|
| 3,493,529 | 2/1970 | Krottinger et al. | 524/5 |
| 4,188,231 | 2/1980 | Valore | 524/5 |
| 4,339,273 | 7/1982 | Meier et al. | 524/5 |
| 4,560,413 | 12/1985 | Takagi et al. | 524/5 |
| 4,778,529 | 10/1988 | Barker et al. | 524/5 |
| 5,814,146 | 9/1998 | Maggio et al. | 524/5 |

FOREIGN PATENT DOCUMENTS

| | | | |
|---|---|---|---|
| 3105576 | 12/1982 | Germany | 524/5 |
| 123850 | 8/1982 | Japan | 524/5 |
| 209866 | 12/1982 | Japan | 524/5 |
| 207158 | 7/1994 | Japan | 524/5 |

*Primary Examiner*—Peter A. Szekely
*Attorney, Agent, or Firm*—Timothy J. Martin; Michael R. Henson; Mark H. Weygandt

[57] ABSTRACT

A cementitious paste capable of setting after an interval of time comprises a mixture of a fines component selected from a group consisting of cement and a blend of cement and pozzolonic material, water and a water soluble polymer that is capable of taking up and releasing water when incorporated into the mixture. The polymer comprises a selected percent by weight of the mixture. A non-foamed cementitious composition is also provided to form a substantially homogeneous, pervious rigid mass that comprises a substantially surfactant-free mixture of the fines component, inert aggregate particles, water and a selected percentage by weight of the water-soluble polymer that is capable of adhesion to the aggregate particles. The fines component, the water and the polymer have proportions with respect to one another and together in a proportion with respect to the aggregate particles sufficient in an absence of surfactant to form a substantially uniform adhesive coating on the aggregate particles such that, upon setting, the aggregate particles are bonded to one another at contact areas thereof. A cementitious powder and a method of forming a substantially homogenous, pervious cementitious rigid body are also provided.

29 Claims, No Drawings

FREEZE/THAW RESISTANT CEMENTITIOUS ADHESIVE FOR COMPOSITE MATERIALS AND METHOD FOR PRODUCTION THEREOF

FIELD OF THE INVENTION

The present invention relates to an improved adhesive cementitious composition for use in making concrete and concrete-like materials. More particularly, the invention is directed to an improved adhesive composition into which is incorporated a concentrated liquid or dry water-soluble polymer capable of taking up and releasing water during hydration and increasing the compressive strength of the concrete. The adhesive composition is in the form of a paste which can be combined with aggregate particles in a single mixing step method and without an aqueous foamed surfactant. This paste is especially useful to make relatively low-compressive-strength concrete materials which are pervious, homogeneous, self-draining, non-shrinking, non-bleeding, and resistant to freeze/thaw damage.

BACKGROUND OF THE INVENTION

Concretes are solid materials formed by combining aggregate particles with a mortar-like paste to form a slurry. Commonly, the mortar-like paste comprises a mixture of cement, such as Portland cement, water, and, optionally, a pozzolonic material. The cement reacts chemically with the water to form a solid material.

It is known in the art that polymers, in liquid form, can be added to cementitious slurries to absorb excess water in the mixture and/or to enhance the properties of the composite materials. It is further known to use polymeric cementitious compositions to make high compressive strength concretes, such as with strengths between about 10,000 and about 30,000 psi. Also, it is known to make highly adhesive concretes, but these generally are expensive and difficult to work with because they set very quickly and are heat sensitive.

Heretofore, the mixing of polyacrylamide polymers into a cementitious slurry has been thought to be possible only in liquid form and then only in conjunction with an aqueous foamed surfactant. To mix a polyacrylamide polymer uniformly into a cementitious slurry, the polymer is added in liquid, diluted form along with a foaming surfactant, followed by foaming the slurry with high pressure compressed air. The foaming step is considered necessary to ensure complete mixing of the component materials into a homogeneous, flowable material which is then poured into a space to be filled and allowed to set. These conventional processes require high pressure foam generating equipment and adroit operators who are able to recognize and respond appropriately to changes in the foam generator output. Visual interpretation of the equipment's operating condition is a subjective art, and the quality of the finished product is highly dependent upon the skill level of the workmen.

Relatively low compressive strength concretes, known as "flow-fill", are commonly used in a variety of applications, such as backfill for bridge abutments and retaining walls, trench backfill for utility and underground cable and pipe line, and subsidence backfill. In other applications, it is desirable to allow fluids to move through the concrete. These fluids, including suspended solids and gases, can either be collected for further processing, or they can be discharged into soil water, or the atmosphere for dispersal. Pervious concrete can be utilized in construction applications, either alone or in conjunction with drainage pipes, to direct water away from a structure or road surface, thereby reducing the potential for damage by erosion, chemical action, or hydraulic pressure.

Conventional cementitious slurries used to make low-strength composite materials generally contain more water than is required to react with the cement. This excess water reduces the slurry viscosity and renders the slurry flowable. These conventional materials commonly settle 5–6 percent or more due to liquid-solid separation before and during setting of the cementitious slurry, resulting in bleeding of excess water from the top and a nonhomogeneous, layered concrete material. Thus, it is often necessary to pour the backfill in stages, known in the art as "lifts", requiring substantial labor and accompanying costs. Further settling and/or compaction after the material sets can cause subsequent problems. For example, settling of bridge abutments can cause bumps and ridges in the overlying roadway at the junction between the abutment and the bridge.

A further disadvantage of conventional low-strength cementitious materials is that excess water can become entrapped in the composite material and/or the adhesive if it is not adequately pervious and/or if the water cannot drain freely from the material. Also, conventional cementitious adhesives are at least somewhat permeable to water. Thus, water, such as might be present from the formation of the composite or due to rain or melting snow, can penetrate the adhesive and migrate in a capillary manner to the interface between the coating and the aggregate. Further, the finished product also contains surfactant, which may enhance the water permeability of the cementitious adhesive by reducing the surface tension necessary to overcome capillary forces. Thus, water entrapped either in hydraulically isolated pore spaces between adhesive-coated aggregate particles, within the adhesive, or at the aggregate/adhesive interface can cause significant spalling and structural damage during repeated cycles of freezing and thawing.

Thus, there is a need for a surfactant-free cementitious adhesive which can be used to prepare relatively low-strength composite materials which are pervious, homogeneous, self-draining, non-shrinking, non-bleeding, and resistant to freeze/thaw damage. There is also a need for a surfactant-free cementitious composite material which is adhesive, pervious, self-draining, non-shrinking, non-bleeding, and resistant to freeze/thaw damage. There is a further need for a simpler, cost-effective method of making cementitious composite materials which does not require the use of surfactants and foam generating equipment. There is yet a further need for a cementitious composition which sets slowly enough to make it easy to emplace and work with. There is an additional need for a low-strength cementitious composite material which can be emplaced in a single stage, without multiple lifts.

SUMMARY OF THE INVENTION

It is an object of the present invention to provide a cementitious adhesive which can be used to prepare composite materials which are pervious, homogeneous, self-draining, non-shrinking, non-bleeding, and resistant to freeze/thaw damage.

It is another object of the present invention to provide a cementitious composite material which is pervious, homogeneous, self-draining, non-shrinking, non-bleeding, resistant to freeze/thaw damage.

It is still a further object of the present invention to provide a simpler, more precise and cost-effective method of making cementitious composite materials which does not require the use of surfactants and foam generating equipment.

Yet another object of the present invention is to provide a cementitious material which is formed from a mixture which sets relatively slowly.

It is an additional object of the present invention to provide a low-strength cementitious composite material which can be emplaced in a single stage, without multiple lifts.

According to the present invention, then, a cementitious paste is provided as well as a non-foamed cementitious composition employing components of the cementitious paste. The present invention also is directed to a method of forming a substantially homogenous, pervious cementitious rigid body using the non-foam cementitious composition. More specifically, the cementitious paste according to the present invention is capable of setting after an interval of time and comprises a mixture of several components, namely, a fines component, a polymer and water. The fines component is selected from a group consisting of cement and a blend of cement in a pozzolonic material. The polymer is one which is capable of taking up and releasing water when incorporated into the mixture and comprises more than 0.004 percent by weight of the mixture. Preferably, the polymer comprises about 0.008 percent by weight. The fines component, the water and the polymer are mixed in the ratio such that the cementitious paste exhibits a volume loss of no greater than 0.1 percent upon setting.

Preferably, the polymer is selected from a group consisting of acrylamide homopolymers, acrylamide copolymers and a combination of acrylamide homopolymers and acrylamide copolymers. Preferably, the polymer is non-ionic and has a molecular weight of at least 1,000,000 Daltons although some polymers having a molecular weight of at least 50,000 Daltons are suitable. The pozzolonic material preferably consists of essentially of fly ash.

The non-foam cementitious composition of the present invention is operative upon setting to form a substantially homogenous, pervious rigid mass comprising a substantially surfactant-free mixture of a fines component, inert aggregate particles, water and a water-soluble polymer that is capable of adhesion to the aggregate particles and of a type that takes up and releases water when incorporated into the mixture. Again, the fines component is selected from a group consisting of cement and a blend of cement and a pozzolonic material. The proportions of the fines component, the water and the polymer with respect to one another and taken together in proportion with respect to the aggregate particles are sufficient to form a substantially uniform adhesive coating on the aggregate particles such that, upon setting of the mixture, the aggregate particles are bonded to one another at contact areas thereof.

In one embodiment, the proportions of the components forming the non-foamed cementitious composition are selected such that the mixture, prior to setting, is capable of maintaining an angle of repose of at least fifteen degrees (15°). In another embodiment, the proportions are selected such that the rigid mass, after setting, has a perviousness in the absence of a hydraulic head of at least 1.0 but referably 5.0 gallons/minute/square foot. The rigid mass, upon setting, preferably has an interconnected pore space of between one percent (1%) and thirty percent (30%) by volume. In another embodiment, the proportions are selected such that the paste, after setting, exhibits sufficient adhesion such that it can withstand a shear force oriented at a 45° plane of at least 200 psi.

The polymer component of the non-foamed cementitious composition preferably comprises no more than 5% by weight of the mixture and, in one embodiment, comprises about 0.002–0.003 percent by weight of the mixture. This polymer has a molecular weight of at least 50,000 Daltons and, as was the case with the cementitious paste, is selected from a group consisting of acrylamide homopolymers, acrylamide copolymers and combination of acrylamide homopolymers and acrylamide copolymers. Preferably, the pozzolonic material consists essentially of fly ash. The aggregate particles may be selected from a group consisting of recycled glass, crushed glass, crushed rock, crushed ceramics, mine tailings, coal ash, perlite, pumice, shredded rubber, chopped rubber, corn husks, sea shells, wood chips, cork, charcoal, polystyrene, polyurethane and mixtures thereof. The fines component is preferably between 0.8 percent and 80.0 percent by weight of the mixture, and the water comprises between 1.8 percent and 20 percent by weight of the mixture. The aggregate particles comprise between fifty and ninety-seven percent (50%–97%) by weight of the mixture.

A cementitious powder is also contemplated by the invention. The powder consists essentially of a mixture of a fines component of either cement or a blend of cement and pozzolonic material along with a polymer that comprises at least 0.0075 percent of the mixture by weight. Preferably, the polymer comprises about 0.015 percent of the mixture by weight. The polymer is again preferably a non-ionic acrylamide.

The method according to the present invention is directed to forming a substantially homogenous, pervious cementitious rigid body. The method comprises a first step of forming a mixture including a polymer, cement, inert aggregate particles and water in an absence of any foamed surfactant and wherein the polymer is capable of taking up and releasing water in the mixture. In this first step, the polymer, the cement and the water are in proportions to one another and together in proportion to the inert aggregate particles so as to be sufficient to form an adhesive coating on the aggregate particles. The method then includes the step of mechanically admixing the mixture for an interval of time sufficiently long to form said adhesive coating on the aggregate particles and thereby to produce a flowable slurry. Next, the slurry is flowed as a cohesive mass into a desired three-dimensional configuration which is followed by the step of allowing the cohesive mass to set into the rigid body. In the preferred method, the step of forming the mixture also includes adding a pozzolonic material thereto. The method may include the step of premixing the cement, the water and the aggregate particles prior to adding the polymer thereto to form the mixture. The method also may include the step of supporting the cohesive mass in the desired three-dimensional configuration.

These and other objects of the present invention will become more readily appreciated and understood from a consideration of the following detailed description of the exemplary embodiments.

DETAILED DESCRIPTION OF THE EXEMPLARY EMBODIMENTS

The present disclosure is broadly directed to a cementitious adhesive composition which can be used to make composite concrete and concrete-like materials. The adhesive composition is a substantially homogeneous paste including a water-soluble polymer, a dry cementitious component, and water. The paste can be formed by mixing the ingredients without the use of a surfactant and without air entrainment, and it can set to form a substantially homogeneous material.

This disclosure is also broadly directed to an improved method for making relatively low-strength homogeneous cementitious composite materials which are pervious, self-draining, non-shrinking, non-bleeding, and resistant to freeze/thaw damage. The adhesive paste in accordance with the present invention can be combined with aggregate particles, such as in a conventional mixing truck or portable on-site mixer, to form a slurry. Alternatively, the adhesive composition can be mixed in any suitable mixing apparatus and subsequently applied to aggregate particles, such as in masonry. The slurry can be poured or allowed to flow into a space adjacent to a structure and allowed to set.

In the slurry, the dry cementitious component, water, and polymer form an adhesive paste which provides a substantially uniform homogeneous coating on the aggregate particles present in the composition. The adhesive paste bonds to the adjacent structure in addition to binding aggregate particles together. As the mixture sets, the coating bonds tightly to the aggregate particles and also binds the particles to each other, forming a porous, pervious, homogeneous three-dimensional structure having interconnecting voids between contact points of adjacent particles. After setting, the coating is substantially impermeable to water, while the interconnecting voids remain and provide significant perviousness.

Surprisingly, it was found that a homogeneous cementitious mixture can even be made when a dry polymer is added, without prior dilution, to the other ingredients in the absence of a surfactant and without using foam generating equipment or dilution. The single mixing step and adhesive composition of the present invention eliminate the need for the foaming surfactant and foam-generating equipment which are required in the conventional multiple step system. Also surprisingly, it was found that concrete products can be formed by the present method without significant temperature increases in the materials as they set, thus eliminating the need to wet down and/or cover newly poured material for temperature control. Consequently, this invention requires less equipment, fewer chemical reagents, and less labor to produce a superior composite product.

The composite produced in accordance with the present invention is useful in a variety of applications, such as backfill for bridge abutments and retaining walls; trench backfill for utility and underground cables and pipe lines; a subsurface drain medium, such as for roadways, outdoor athletic fields, pollution containment cells, and landfills; and a subsidence backfill. The composite is a pervious concrete or concrete-like material which also can be used in place of low-strength concrete, or flow-fill; as a structural backfill; or in place of impermeable concrete mixtures for road or parking lot surfaces in situations where it is desirable to allow the water to drain directly into the soil at a controlled rate of flow. In landfills, pollutant containment cells, and containment structures for nuclear reactors, pervious concrete can be used in combination with impervious materials to collect and direct pollutants for subsequent treatment.

In the following discussion, the term "concrete-like" refers to a composite material comprising aggregate particles bound in a cementitious adhesive. The adhesive forms a uniform coating on the aggregate particles which is sufficiently thin that there are interconnected voids or pore spaces between the coated particles. Thus, the composite material has a three-dimensional porous structure, somewhat like a rigid sponge or a popcorn ball.

"Pervious" and "perviousness" are used to describe the ability of water to flow through the bulk concrete-like material via the interconnected pore spaces. In contrast, "permeable" and "permeability" refer to the ability of water to pass into and through the cementitious adhesive. In the pervious material formed in accordance with the present invention, water can flow through pore spaces bounded by adhesive-bound particles but is substantially less likely to permeate into or through capillary spaces which may be present within the adhesive or at the adhesive/particle interface.

As is known to those skilled in the art, cement is a fine-grained calcareous, siliceous composition which reacts with water to form a hard material which can be used as a binder, such as in concrete and mortar. An example is Portland cement, which comprises limestone which has been calcined with chalk, mud, etc. Pozzolonic materials are fine-grained materials which contain calcium oxide and also react with water. Examples of pozzolonic materials include volcanic ash and fly ash. These materials act synergistically with cement, and are often less expensive than cement. Thus, the cost of the composite material can be reduced by combining cement with one or more pozzolonic materials.

As used herein, the term "aggregate particles" refers to particles which can be mixed with and coated by the adhesive material to form a composite material. The particles are inert in the sense that they will not undergo any significant chemical reaction with any of the other components of the cementitious slurry, the composite material, or any other substances which may be present in the environment in which the composite is placed. The material can comprise one or more inorganic or organic based materials, or a combination thereof, and the particles may themselves be multi-grained composites. Recycled glass, crushed glass, crushed ceramics, mine tailings, crushed rock, crushed and whole bricks, coal ash, slag, perlite, pumice are examples of suitable inorganic materials. Shredded and/or chopped rubber tires, corn husks, sea shells, wood chips, cork, charcoal, polystyrene, and polyurethane materials are examples of organic based materials. In general, the aggregate particles have a nominal diameter of at least ¼ inch, and they can have diameters up to about 4 inches. Unlike most cementitious products, it is not necessary to include sand-sized particles with diameters less than ⅛ inch.

In accordance with the present invention, the polymer can be any suitable water-soluble polymer capable of adhesion to solid materials and which has the ability, when incorporated into a cementitious composition, of taking up and releasing water. The water may be taken up either by absorption or by adsorption or by a combination thereof. Several polymers which are used as flocculants for water clarification have proved effective. More preferably, the polymer is an acrylamide homopolymer or copolymer. Most preferably, the polymer is a dry nonionic acrylamide homopolymer. Preferably, the polymer has a molecular weight of at least 50,000 Daltons. One such polymer which has proved particularly effective is FA 920 N, available from Chemtall Inc., P.O. Box 250, Riceboro, Ga. 31323, USA.

The cementitious composite is made by mixing a dry ingredient, water, and aggregate particles with the water-soluble polymer to form a slurry which then sets. The dry ingredient can be cement or a combination of cement and pozzolanic material. The polymer may be in any convenient form, including aqueous solutions and water-in-oil emulsions. A water-in-oil emulsion can be used without first inverting the emulsion to the oil-in-water emulsion. Preferably, the polymer is added as a dry powder. If the slurry is to be subsequently placed in a space, such as in a utility line trench or abutting a bridge, it should be flowable yet have an angle of repose of at least 15° but preferably about 45°, and it should not set so quickly that it is difficult to work with. Mixtures which remain flowable for as long as 2 hours can be formed in accordance with the present invention and emplaced at a desired location. The properties of the composite product depend in a predictable way upon the relative quantities of cement, pozzolanic material, water, polymer, and aggregate used and upon the aggregate particle composition. Thus, quantities of the components and the aggregate particle composition are selected to produce a mixture which is homogeneous, flowable, has an angle of repose of at least 15° but preferably about 45°, and sets to obtain substantially full compressive strength in about 7–10 days.

The set concrete-like material can have other, predetermined, properties based on the particular circumstances in which it will be used. These properties include compressive strength, density, pore size, pore volume, drainage rate, perviousness, adhesion, adhesive impermeability, shrink resistance, bleed resistance, and resistance to freeze/thaw damage. For example, the bulk density of the final product depends upon the density of the aggregate particles and the relative amounts of all components. The compressive strength of the final product can range from about 20 psi to the 50–60 psi characteristic of many natural soils to about 3000 psi or more and is a function of the relative amounts of the components and, particularly, of the type and composition of the polymer and the aggregate particles. The perviousness is related to the size of the pore spaces, and thus to the aggregate particle size distribution and the thickness of the coating on the particles. The diameter of the pore spaces between particles depends upon particle size and the thickness of the coating. If the particles are poorly sorted for size, smaller particles can lodge in spaces between larger particles and reduce the size of the pore space.

In accordance with the present invention, it is possible to produce cementitious composite materials having interconnected pore volumes comprising between about 1 percent and about 30 percent of the composite volume. Such composite materials permit water ingress and egress at rates ranging from less than 1 gpm/ft$^2$ to more than 5 gpm/ft$^2$ due to gravity, without a hydraulic head.

It is also possible to produce composite materials which exhibit little or no shrinkage as they set and wherein volume loss upon drying to final set is 0.1 percent or less and visually imperceptible. In contrast, conventional low-strength flow-fill materials shrink 5 to 6 percent or more due to bleeding, compaction and evaporation of excess water. It is believed that the polymer present in the composite of the present invention absorbs or adsorbs substantially all of the free water which is present as the slurry sets.

Composites prepared in accordance with the present invention in this manner have particle coatings which are highly adhesive and which are relatively impermeable to water. The interconnected pore spaces provide a zone for residual water present within the composite, such as immediately after a storm. Because the water remains substantially in the pore spaces and does not enter the coating or the interface between the coating and particle surfaces, the composite material is substantially resistant to spalling, delamination, and other damage from water expansion during repeated freeze/thaw cycles.

In accordance with the present invention, the slurries have been prepared using as little as about 0.004 weight percent dry polymer or less than about 10 percent by weight of a 10:1 oil:water polymer emulsion. The fines fraction, comprising cement or cement and fly ash, can be between about 0.8 weight percent and about 80 weight percent of the slurry. The aggregate particles, consisting of crushed rock, can comprise between fifty and about ninety-seven weight percent of the slurry. Water can comprise between about 1.6 weight percent and 20 weight percent.

Generally, it is easier to measure the quantities of the ingredients of the cementitious composition by weight. However, the particle surface area and the volume ratio of aggregate particles to cement, pozzolanic material, water, and polymer are important in determining the coating thickness and the properties of the slurry and of the composite material formed when the slurry sets. Thus, if aggregate particle having a significantly different density are used, it may be advantageous to consider the volume fractions or percentages of the different components when formulating a me examples below, the aggregate particles consist of squeegee, a commonly used and readily available type of crushed rock. The use of the same weight percentage of another material with a significantly different density, such as slag, perlite, pumice, or organic based materials, as aggregate particles would result in a composite product with different properties.

EXAMPLES 1–3

Three plastic cylinders having dimensions of 4 inches in height or 2 inches in diameter are sliced diagonally to form six wedge-like troughs. Cementitious pastes are prepared by mixing ingredients as shown in Table I. For each paste composition, the sand, cement, and water are mixed to form a slurry. The composition of Sample 1 is similar to a conventional concrete cement composition and served as a control sample. For the compositions of Samples 2 and 3, a high molecular weight liquid cationic polyacrylamide flocculent, Percol Polyhall 1001®, is then mixed into the slurry. Polyhall 1001 was formerly available from Celanese Plastics and Specialties Company, 1 Riverfront Plaza, Louisville, Ky. 40202, telephone (800) 626–5331. Two of the plastic wedges are filled with paste from each sample, and the pastes are allowed to set and cure for 28 and the pastes are allowed to set and cure for 28 days.

TABLE 1

| Sample No. | Sand, lb. | Cement, lb. | Water, lb. | Polymer |
| --- | --- | --- | --- | --- |
| 1 | .035 | 0.52 | 0.23 | None |
| 2 | .035 | 0.50 | 0.26 | Several drops |
| 3 | .035 | 0.21 | 0.12 | Several drops |

For each of the compositions shown in Table I, a second batch of paste is then prepared and used to bond together the two wedges from the paste having the same composition. The paste forming the bonds is allowed to cure for 28 days. Each of the resulting cylinders has a distinct, uniform composition.

One at a time, each glued cylinder is placed in a press in a vertical position, and force is applied progressively to the 2-inch diameter top of the cylinder until the cement bond fails. In each case, the first failure occurs at the bond. Table II shows the compressive forces and pressures applied to each pair of wedges at the failure of the bond.

TABLE II

| Sample No. | Force applied to face (lbs.) | Pressure applied to face (psi) | Force Normal to plane of bond (lbs.) | Shear force parallel to plane of bond (psi) | Pressure Normal to plane of bond (lbs.) | Shear pressure parallel to plane of bond (psi) |
|---|---|---|---|---|---|---|
| 1 | 5,140 | 1,636 | 2,570 | 372 | 4,451 | 644 |
| 2 | 14,800 | 4,711 | 7,400 | 1,071 | 5,000 | 724 |
| 3 | 10,000 | 3,188 | 5,000 | 724 | 8,660 | 1,253 |

It can be seen that the addition of a small quantity of polymer significantly increases the compressive strength of the cement bond. For similar proportions of sand, cement, and water in the slurries, the compressive strength is almost three times as great when the polymer is added to the slurry. When the quantity of sand is increased significantly and the quantities of cement and water are decreased in a manner known to result in a lower compressive strength product, the compressive strength is still approximately twice that of the control of Sample 1, which does not contain polymer.

EXAMPLES 4–19

200 g cement, 100 g fly ash, and 1540 g crushed rock (squeegee) are mixed in a Twin Shell V laboratory mixer. The resulting mixture of dry ingredients is divided with a Jones splitter into 20 equal samples weighing about 97 g each. Floerger® EM 230 nonionic polyacrylamide emulsion is dried under vacuum and low heat to form a solid residue, and the residue is ground with a mortar and pestle. Eight grams of water and a quantity of polyacrylamide powder are added to each of 16 of the samples. Table III shows the quantities of polyacrylamide added to each of 16 samples and the qualitative results. EM 230 polyacrylamide is available from Chemtall Inc., P.O. Box 250, Riceboro, Ga. 31323.

TABLE III

| Test No. | Polymer weight, mg | Observation |
|---|---|---|
| 4 | 2 | No observed viscosity change due to polymer |
| 5 | 4 | No observed viscosity change due to polymer |
| 6 | 6 | Viscosity of mixture slightly increased, like warm syrup, too wet and not adhesive |
| 7 | 8 | Viscosity of mixture slightly increased, like warm syrup, too wet and not adhesive |
| 8 | 10 | Viscosity of mixture slightly increased, like warm syrup, too wet and not adhesive |
| 9 | 12 | Viscosity increases, but angle of repose too low (less than 45° |
| 10 | 14 | Noticeable effect, angle of repose still too low; material noticeably drier |
| 11 | 16 | Viscosity and dryness increase; angle of repose still too low |
| 12 | 18 | Slurry consistency looks good, almost acceptable; agglomerates form and slurry is quite sticky |
| 13 | 20 | Slurry has desired consistency; shows pervious channels and remains tacky with strong adhesive characteristics, yet "wet" enough for gravity flow; angle of repose about 45° |
| 14 | 22 | Slurry has desired consistency; shows pervious channels and remains tacky with strong adhesive characteristics, yet "wet" enough for gravity flow; angle of repose about 45° |
| 15 | 24 | Slurry has desired consistency; shows pervious channels and remains tacky with strong adhesive characteristics, yet "wet" enough for gravity flow; angle of repose about 45° |
| 16 | 26 | Slurry has desired consistency; shows pervious channels and remains tacky with strong adhesive characteristics, yet "wet" enough for gravity flow; angle of repose about 45° |
| 17 | 28 | Slurry has desired consistency; shows pervious channels and remains tacky with strong adhesive characteristics, yet "wet" enough for gravity flow; angle of repose about 45° |
| 18 | 30 | Slurry probably too dry |
| 19 | 40 | Slurry very sticky, will not move, not useful |

EXAMPLES 20–38

30 g cement, 30 g fly ash, and 1880 g crushed rock (squeegee) are mixed in a Twin Shell V laboratory mixer. The resulting dry mixture is divided into 20 equal samples weighing about 97 g each. Floerger® EM-230 nonionic polyacrylamide emulsion is dried and ground, as in Example 1. Three g of water and a quantity of dried polyacrylamide are added to each of 19 aliquots. Table IV shows the quantities of polyacrylamide added to each sample and the qualitative results.

TABLE IV

| Test No. | Polymer weight, mg | Observation |
|---|---|---|
| 20 | 2 | No visual effect on viscosity, texture, or adhesiveness |
| 21 | 4 | No visual effect on viscosity, texture, or adhesiveness |
| 22 | 6 | No visual effect on viscosity, texture, or adhesiveness |
| 23 | 8 | No visual effect on viscosity, texture, or adhesiveness |
| 24 | 10 | No visual effect on viscosity, texture, or adhesiveness |
| 25 | 12 | Abrupt change in viscosity; becomes viscous end drier |
| 26 | 14 | Consistency approaching normal |
| 27 | 16 | Consistency approaching normal |
| 28 | 18 | Consistency approaching normal |
| 29 | 20 | Slurry has desired consistency; show pervious channels and remains tacky with strong adhesive characteristics, yet "wet" enough for gravity flow |
| 30 | 22 | Slurry has desired consistency; shows pervious channels and remains tacky with strong adhesive characteristics, yet "wet" enough for gravity flow |
| 31 | 24 | Slurry has desired consistency; shows pervious channels and remains tacky with strong adhesive characteristics, yet "wet" enough for gravity flow |
| 32 | 26 | Slurry has desired consistency; shows pervious channels and remains tacky with strong adhesive characteristics, yet "wet" enough for gravity flow |
| 33 | 28 | Slurry too dry, too viscous; lumps form |
| 34 | 30 | Slurry drier and sore lumps form |
| 35 | 40 | Amorphous mass, very sticky and impossible to work with |
| 36 | 60 | Amorphous mass, very sticky and impossible to work with |

TABLE IV-continued

| Test No. | Polymer weight, mg | Observation |
|---|---|---|
| 37 | 80 | Amorphous mass, very sticky and impossible to work with |
| 38 | 100 | Amorphous mass, very sticky and impossible to work with |

Thus, it is possible to use a dry polymer in making homogenous cementitious slurries which are simultaneously strongly adhesive and capable of gravity flow. For each combination of crushed rock, cement, fly ash, and water, slurries having desirable characteristics can be formed with a range of polymer concentrations. The range of polymer concentrations which will result in a slurry having desired properties depends upon the proportions of the other ingredients in the slurry.

EXAMPLES 39–40

Quantities of squeegee crushed rock, cement, fly ash and dried Floerger® EM 230 nonionic polyacrylamide powder, as shown in Table V, are dry mixed in a Twin Shell V laboratory mixer. In each case, the powdered polymer mixes well with the other ingredients. Water is then added with continued mixing. Water becomes assimilated so that the mixture thus becomes less plastic and acquires a texture similar to caramel-coated popcorn. Each slurry is poured into a cylinder which is four inches in diameter and eight inches long, and then it is allowed to cure for two days at temperatures between 21° and 27° C. In each case, the overall appearance of the cured material is almost the same as the wet slurry, with a porosity of about 20 percent. Both materials have excellent adhesiveness and compressive strength.

TABLE V

| Sample No. | Crushed Rock (g) | Cement (g) | Fly ash (g) | Water (g) | Polymer (mg) |
|---|---|---|---|---|---|
| 39 | 1540 | 200 | 100 | 160 | 24 |
| 40 | 1880 | 300 | 30 | 60 | 24 |

Thus, porous cement-like aggregate materials can be formed at a laboratory scale using widely varying proportions of crushed rock, cement, aggregate, and water.

EXAMPLES 41–59

Several larger batches of slurry are prepared, each containing 2 lb of cement, 1 lb of fly ash, 1.6 lb of water, 15 lb of crushed rock (squeegee), and 2.8 g of a polymer. The ingredients are mixed in a 1 cubic foot cement mixer, at ambient temperature and pressure. The polymers used and the results are described in Table VI.

TABLE VI

| Sample | Polymer | Form | Results |
|---|---|---|---|
| 41 | FLOERGER ® FA 920 N* Nonionic polyacrylamide | Powder | Works well. Slurry exhibits coral-like spikes indicating stiffness and has good flow characteristics, good porosity, and a good angle of repose |
| 42 | FLOERGER ® FA 920 SH* Nonionic polyacrylamide mw 15–20,000,000 | Powder | Works effectively. Slurry texture creamy, less porous and wetter than batch with FA920-N |
| 43 | FLOERGER ® FA 920 VHM* Anionic polyacrylamide mw ≧20,000,000 | Powder | Works effective. Slurry texture, porosity, adhesiveness between results for FA920-N and FA-920 SH |
| 44 | FLOERGER ® FA 920 VHM* Anionic polyacrylamide mw ≧20,000,000 | Powder | Works effectively |
| 45 | FA902 SH* Nonionic polyacrylamide | Powder | Works effectively |
| 46 | Polyhall 1320+ High mw Nonionic polyacrylamide | Powder | Works effectively. Very close to results with FLOERGER ® 920 N |
| 47 | Percol ® 351** Nonionic polyacrylamide | Powder | Worked reasonably well, product similar to that obtained with FLOERGER ® 920 N polymer |
| 48 | Percol ® E10* Low me Anionic polyacrylamide | Powder | Worked reasonabiy well, product similar to that obtained with FLOERGER ® 920 N polymer |
| 49 | Percol ® 156 Allied Colloid Medium mw Anionic polyacrylamide | Micro bead | Unsatisfactory results |
| 50 | Percol ® 511** Very high mw Anionic polyacrylamide | Micro bead | Worked reasonably well, product similar to that obtained with FLOERGER ® 920 N polymer |
| 51 | Percol ® 455** Ultra high mw Cationic polyacrylamide | Powder | Worked reasonably well, product similar to that obtained with FLOERGER ® 920 N polymer |
| 52 | Percol ® 292** Medium mw Cationic polyacrylamide | Micro bead | Did not work well |
| 53 | FLOERGER ® EM-230* 31% active, Anionic polyacrylamide mw ≧20 million | Liquid emulsion | Works very well. Best results obtained |
| 54 | 737 HL** High mw Cationic copolymer of quaternary acrylamide salt and acrylamide | Liquid emulsion | Unacceptable results. Low perviousness due to poor adhesiveness; no "popcorn" texture |
| 55 | 211 L** High mw Cationic polyacrylamide | Liquid | Unacceptable results |
| 56 | PAMAK ® WD≠ Blended tall oil, fatty acids and resin acids | Liquid | Produced an amorphous oily slurry with very poor porosity and no adhesiveness |

TABLE VI-continued

| Sample | Polymer | Form | Results |
|---|---|---|---|
| 57 | PAMAK ® WD≠ Blended tall oil, fatty acids and resin acids | Liquid | Slurry had no adhesiveneas or porosity |
| 58 | PAMAK ® WD≠ Blendad tall oil, fatty acids and resin acids | Liquid | Slurry had no adhesiveness or porosity |
| 59 | Mountain Grout§ Polyurethane | Liquid | Product formed rock-like substance too quickly for use in conventional cement trucks. Unacceptable odor |

*Available from Chemtall Inc., P.O. Box 250, Riceboro, GA 31323
**Available from Allied Colloids, Inc., 161 Dwight Place, Fairfield, NJ 07006
+Available from Hi-Tek Polymers, Inc., 9808 Bluegrass Parkway, Louisville, Kentucky 40299
≠Available from Hercules Incorporated, Hercules Plaza, Wilmington, Delaware 19894
§Available from Green Mountain International, Inc., 50 S. Main Street, Waynesville, NC 28786

EXAMPLES 60–69

Mixes are prepared using 0.4 liters/yd$^3$ of undiluted Floerger EM 230 nonionic polyacrylamide emulsion and varying quantities of dry ingredients and water in a conventional cement mixer truck. Each mix is poured and allowed to cure. Table VII compares the ratio of water to cement and the water content for these mixes.

TABLE VII

| | Composite mix design | | | | | |
|---|---|---|---|---|---|---|
| Sample No. | Particulate material (lb) | Cement (lb) | Fly Ash (lb) | Water (gal) | Ratio, water/ cement | Weight % water |
| 60 | 2500 sand | 564 | 200 | 42 | 0.62 | 9.69 |
| 61 | 2500 sand | 564 | 200 | 37 | 0.55 | 8.63 |
| | 2500 sand | 564 | 200 | 40 | 0.59 | 9.27 |
| 63 | 2900 crushed rock | 400 | 200 | 30 | 0.54 | 6.67 |
| 64 | 3000 crushed rock | 200 | 200 | 17 | 0.71 | 4.0 |
| 65 | 3000 crushed rock | 200 | 100 | 17 | 0.71 | 4.12 |
| 66 | 3000 crushed rock | 100 | 100 | 16 | 1.34 | 4.0 |
| 67 | 3000 crushed rock | 100 | 100 | 10 | 0.83 | 2.52 |
| 68 | 3000 crushed rock | 50 | 50 | 8 | 1.34 | 1.84 |

All of the above mixture compositions yield slurries having desirable properties, with the exception of Examples 60 and 66, which are too wet, and example 61, which is too dry. Sample number 64 is entirely homogeneous, contains no excess water, and does not bleed. Thus, it is apparent that the water content must be within a narrow range to produce a suitable slurry composition with specified quantities of particulate material, cement, and fly ash. However, the appropriate quantity of water is highly dependent on the quantities of the other materials. Moreover, suitable slurries can be obtained at a full commercial field scale comparable to that required for many construction projects.

EXAMPLES 69–79

Mixes were prepared using 0.4 liters/yd$^3$ of undiluted Floerger EM 230 nonionic polyacrylamide emulsion, without dilution, and varying quantities of dry ingredients and water in a conventional cement mixer truck. The mixes were tested for compressive strength after setting for 3, 7, and 10 days. Table VIII compares the results for conventional mixes prepared with the prior art foam method and for mixes prepared with the non-foamed method of the present invention.

From the data in Table VIII, it can be seen that the addition of the polymer without foaming the mixture resulted in dramatic increases in compressive strength after 10 days, with approximately the same proportions of other ingredients. Decreasing the water content increased the compressive strength, and the results are reproducible.

The method according to the present invention is directed to forming a substantially homogenous, pervious cementitious rigid body. The method comprises a first step of forming a mixture including a polymer, cement, inert aggregate particles and water in an absence of any foamed surfactant and wherein the polymer is capable of taking up and releasing water in the mixture. In this first step, the polymer, the cement and the water are in proportions to one another and together in proportion to the inert aggregate particles so as to be sufficient to form an adhesive coating on the aggregate particles. The method then includes the step of mechanically admixing the mixture for an interval of time sufficiently long to form said adhesive coating on the aggregate particles and thereby to produce a flowable slurry. Next, the slurry is flowed as a cohesive mass into a desired three-dimensional configuration which is followed by the step of allowing the cohesive mass to set into the rigid body. In the preferred method, the step of forming the mixture also includes adding a pozzolonic material thereto. The method may include the step of premixing the cement, the water and the aggregate particles prior to adding the polymer thereto to form the mixture. The method also may include the step of supporting the cohesive mass in the desired three-dimensional configuration.

TABLE VIII

| Sample No. | Mix composition, lbs/yd³ | | | | Foam, sec./yd³ | Bulk density lb/ft³ | Void volume % | Lab or Field | Rodded | Compressive strength, psi | | |
|---|---|---|---|---|---|---|---|---|---|---|---|---|
| | cement | fly ash | crushed rock | water | | | | | | 3 day | 7 day | 10 day |
| 69 | 200 | 200 | 3000 | 142 | 7.5 | 126.4 | 16.4 | Lab | | 405 | 725 | 785 |
| | | | | | | | | Field | No | 550 | 720 | 850 |
| 70 | 200 | 100 | 3000 | 142 | 7.5 | 122.6 | 16.5 | Lab | Yes | 240 | 405 | 420 |
| | | | | | | | | Field | No | 430 | 945 | 805 |
| 71 | 200 | 200 | 3000 | 142 | 7.5 | 126.4 | 16.4 | Lab | Yes | 405 | 725 | 785 |
| | | | | | | | | Field | No | 550 | 720 | 850 |
| 72 | 200 | 100 | 3000 | 142 | 7.5 | 122.6 | 16.5 | Lab | Yes | 240 | 425 | 420 |
| | | | | | | | | Field | No | 430 | 945 | 805 |
| 73 | 100 | 100 | 3000 | 83 | 7.5 | 105 | N.D. | Lab | Yes | 145 | 240 | 325 |
| | | | | | | | | Field | No | 240 | 375 | 600 |
| 74 | 100 | 100 | 3000 | 83 | 12.0 | 105 | N.D. | Lab | N.D. | N.D. | N.D. | N.D. |
| | | | | | | | | Field | No | N.D. | 255 | 355 |
| 75 | 50 | 50 | 3000 | 67 | 12.0 | 105 | N.D. | Lab | Yes | 28 | 40 | 45 |
| | | | | | | | | Field | No | 50 | 85 | 70 |
| 76 | 50 | 50 | 3000 | 58 | None | N.D. | N.D. | Field | No | N.D. | 90 | 40* |
| 77 | 50 | 50 | 3000 | 83 | None | N.D. | N.D. | Field | No | 50 | 90 | 150 |
| 78 | 400 | 200 | 2900 | 250 | None | N.D. | N.D. | Field | No | N.D. | 1520 | 2320 |
| 79 | 400 | 200 | 2900 | 250 | None | N.D. | N.D. | Field | No | N.D. | 1490 | 2350 |

*Sample was damaged

In addition to the above described examples, the present invention may also be characterized as a dry cementitious powder mixture consisting essentially of the fines component and a dry polymer (of the types identified above) with the polymer comprising at least 0.0075 percent of the mixture by weight. Preferably the polymer is about 0.015 percent by weight. When water is added to form the paste and the paste is dried, it has been found to exhibit sufficient adhesion to withstand a shear force oriented at a 45° plane that is at least 200 psi.

Accordingly, the present invention has been described with some degree of particularity directed to the exemplary embodiment of the present invention. It should be appreciated, though, that the present invention is defined by the following claims construed in light of the prior art so that modifications or changes may be made to the exemplary embodiments of the present invention without departing from the inventive concepts contained herein.

We claim:

1. A cementitious paste capable of setting after an interval of time and comprising a mixture of a fines component that is selected from a group consisting of cement and a blend of cement and a pozzolonic material, water and a water soluble polymer capable of taking up and releasing water when incorporated into said mixture, said polymer comprising more than 0.004 and no more than 0.134 percent by weight of said mixture.

2. A cementitious paste according to claim 1 wherein said polymer comprises about 0.008 percent by weight.

3. A cementitious paste according to claim 1 wherein said polymer is selected from a group consisting of acrylamide homopolymers, acrylamide copolymers and a combination of acrylamide homopolymers and acrylamide copolymers.

4. A cementitious paste according to claim 3 wherein said polymer is non-ionic.

5. A cementitious paste according to claim 1 wherein said pozzolonic material consists essentially of fly ash.

6. A cementitious paste according to claim 1 wherein proportions of the fines component, the polymer and water are selected such that, after setting, the cementitious paste exhibits sufficient adhesion such that it can withstand a shear force oriented at a 45° plane of at least 200 psi.

7. A non-foamed cementitious composition operative upon setting to form a substantially homogenous, pervious rigid mass, comprising a substantially surfactant-free mixture of:
   (i) a fines component selected from a group consisting of cement and a blend of cement and a pozzolonic material;
   (ii) inert aggregate particles;
   (iii) water; and
   (iv) between about 0.001 and about 0.0315 percent by weight of a water-soluble polymer capable of adhesion to said aggregate particles and of a type that takes up and releases water when incorporated into said mixture, and wherein said fines component, said water, and said polymer having proportions with respect to one another and together in a proportion with respect to said aggregate particles sufficient in an absence of surfactant to form a substantially uniform adhesive coating on said aggregate particles such that, upon setting, said aggregate particles are bonded to one another at contact areas thereof.

8. A non-foamed cementitious composition according to claim 7 wherein said proportions are selected such that said mixture prior to setting is capable of maintaining an angle of repose of at least 15°.

9. A non-foamed cementitious composition according to claim 7 wherein said polymer comprises between about 0.019 and about 0.027 percent by weight of said mixture.

10. A non-foamed cementitious composition according to claim 7 wherein said polymer is selected from a group consisting of acrylamide homopolymers, acrylamide copolymers and a combination of acrylamide homopolymers and acrylamide copolymers.

11. A non-foamed cementitious composition according to claim 7 wherein said pozzolonic material consists essentially of fly ash.

12. A non-foamed cementitious composition according to claim 7 wherein said aggregate particles are selected from a group consisting of recycled glass, crushed glass, crushed rock, crushed ceramics, mine tailings, coal ash, perlite, pumice, shredded rubber, chopped rubber, corn husks, sea shells, wood chips, cork, charcoal, polystyrene, polyurethane, and mixtures thereof.

13. A non-foamed cementitious composition according to claim 7 wherein said fines component comprises between 0.8 percent and 80.0 percent by weight of said mixture.

14. A non-foamed cementitious composition according to claim 7 wherein said water comprises between 1.6 percent and 20 percent by weight of said mixture.

15. A non-foamed cementitious composition according to claim 7 wherein said aggregate particles comprise at least fifty to ninety-seven percent by weight of said mixture.

16. A non-foamed cementitious composition according to claim 7 wherein said rigid mass has an interconnected pore space of between 1 percent and 30 percent by volume.

17. A non-foamed cementitious composition according to claim 7 wherein said proportions are selected such that said rigid mass has a perviousness in the absence of a hydraulic head of at least 1.0 gallons/minute/square foot.

18. A non-foamed cementitious composition according to claim 7 wherein said polymer comprises at least 0.002–0.003 percent by weight.

19. A cementitious powder consisting essentially of a mixture of a fines component that is selected from a group consisting of cement and a blend of cement and a pozzolonic material and a polymer powder capable of taking up and releasing water when combined therewith, said polymer powder comprising at least 0.0075 and no more than about 0.21 percent of said mixture by weight.

20. A cementitious power according to claim 19 wherein said polymer powder comprises about 0.015 percent of said mixture by weight.

21. A cementitious powder according to claim 19 wherein said polymer is selected from a group consisting of acrylamide homopolymers, acrylamide copolymers and a combination of acrylamide homopolymers and acrylamide copolymers.

22. A cementitious powder according to claim 19 wherein said polymer is non-ionic.

23. A method of forming a substantially homogenous, pervious cementitious rigid body comprising the steps of:
   (a) forming a mixture including between about 0.001 and about 0.0315 percent by weight of a polymer powder, cement, inert aggregate particles and water in an absence of any foamed surfactant, said polymer capable of taking up and releasing water in said mixture, and wherein said polymer, said cement and said water are in proportions to one another and together in proportion to said inert aggregate particles sufficient to form an adhesive coating on said aggregate particles;
   (b) mechanically mixing said mixture in an absence of any foamed surfactant for an interval of time sufficiently long to form said adhesive coating on said aggregate particles and thereby produce a flowable slurry;
   (c) flowing said slurry as a cohesive mass into a desired three-dimensional configuration; and
   (d) allowing said cohesive mass to set into said rigid body.

24. The method of claim 23 wherein the step of forming said mixture includes adding a pozzolonic material thereto.

25. The method of claim 23 including the step of pre-mixing said cement, said water and said aggregate particles prior to adding said polymer powder thereto to form said mixture.

26. The method of claim 23 including the step of supporting said cohesive mass in the desired three-dimensional configuration.

27. A cementitious rigid body, comprising a mixture of a water soluble polymer, inert aggregate particles, and a fines component selected from a group consisting of cement and a blend of cement and a pozzolonic material, wherein said rigid body has an interconnected pore space of between 1 percent and 30 percent by volume, wherein said water soluble polymer comprises from about 0.001–0.002 weight percent to about 0.032–0.038 weight percent of said cementitious rigid body.

28. A cementitious rigid body according to claim 27, wherein said rigid body has a perviousness in the absence of a hydraulic head of at least 1.0 gallons/minute/square foot.

29. A cementitious rigid body according to claim 27 wherein said aggregate particles have a nominal diameter of at least ¼ inch.

* * * * *